United States Patent [19]

Bilow et al.

[11] 4,100,138

[45] Jul. 11, 1978

[54] ETHNYL TERMINATED POLYIMIDE COMPOSITES

[75] Inventors: Norman Bilow, Encino; Boyce G. Kimmel, Palos Verdes Peninsula, both of Calif.

[73] Assignee: Hughes Aircraft Company, Culver City, Calif.

[21] Appl. No.: 576,909

[22] Filed: May 12, 1975

[51] Int. Cl.² ............................................. C08G 73/12
[52] U.S. Cl. ............................ 526/262; 260/37 N; 428/435; 428/474; 526/285; 526/247; 528/311
[58] Field of Search ...................... 428/474, 435; 260/47 CP, 47 UA, 63 R, 63 UY, 65, 78 UA, 78 TF, 50, 49, 37 N

[56] References Cited

U.S. PATENT DOCUMENTS

| | | | |
|---|---|---|---|
| 3,845,018 | 10/1974 | Bilow et al. | 260/47 CP |
| 3,879,349 | 4/1975 | Bilow et al. | 260/47 UA |
| 3,897,395 | 7/1975 | D'Alelio | 260/63 N |

Primary Examiner—Lester L. Lee
Attorney, Agent, or Firm—B. T. Hogan, Jr.; W. H. MacAllister

[57] ABSTRACT

A new class of copolymers obtained via the copolymerization of diethynylbenzene with an ethynyl-substituted polyimide oligomer has been used to prepare composite materials exhibiting zero void content. The copolymers are thermosetting in character and are particularly useful for the fabrication of composite structures such as glass fiber reinforced laminates and molding compounds and graphite fiber reinforced laminates and molding compounds.

8 Claims, 6 Drawing Figures

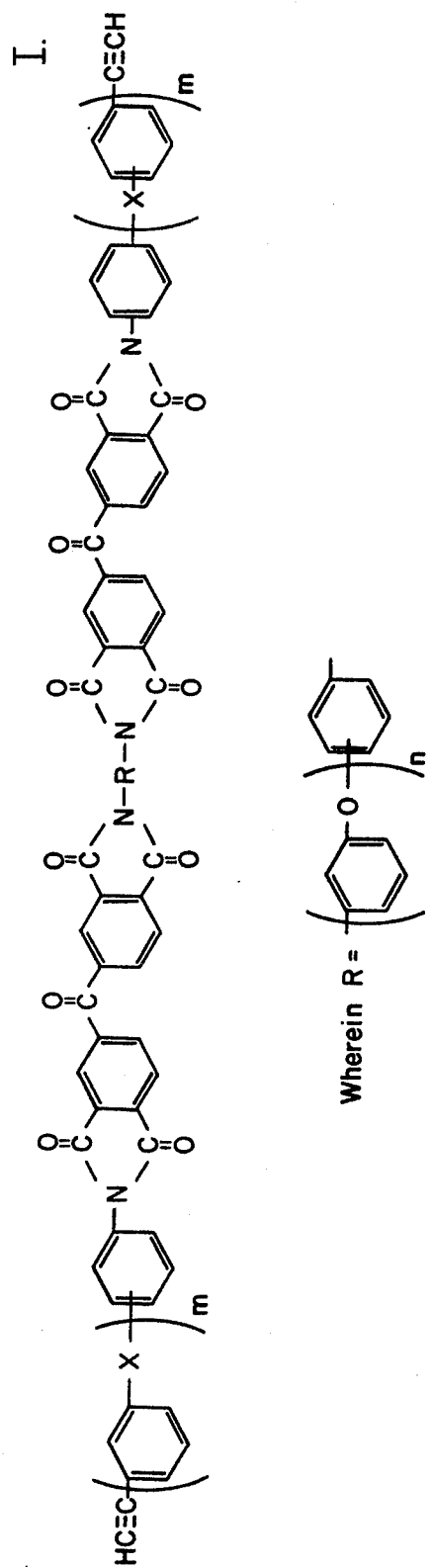

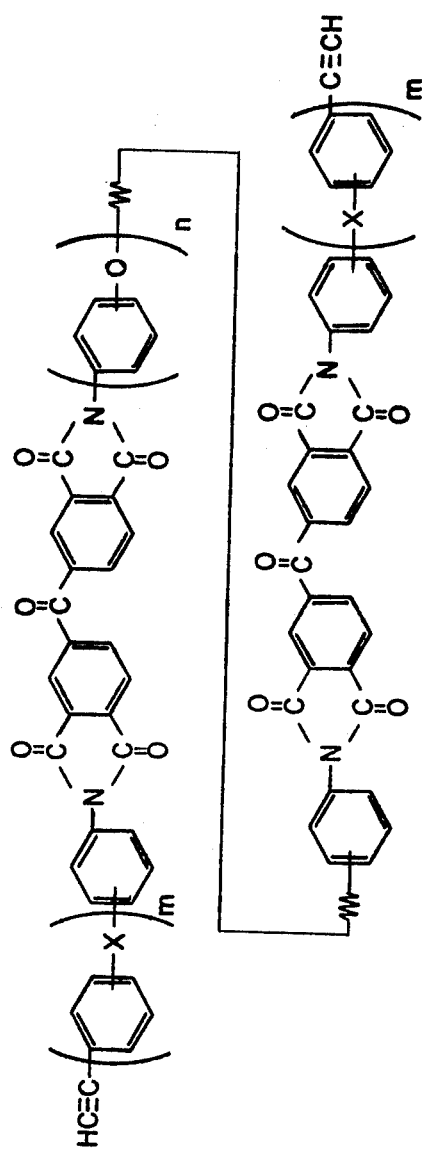

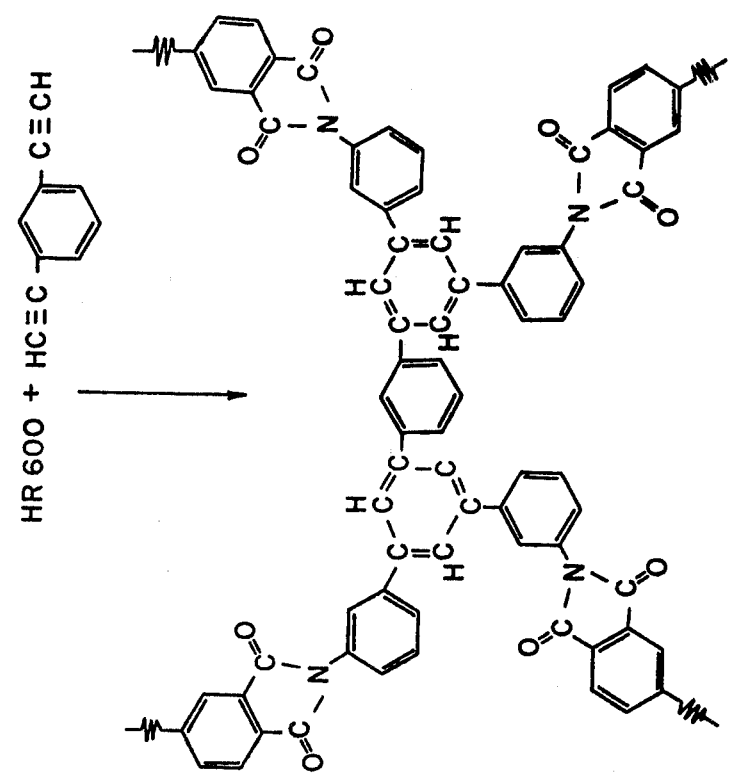

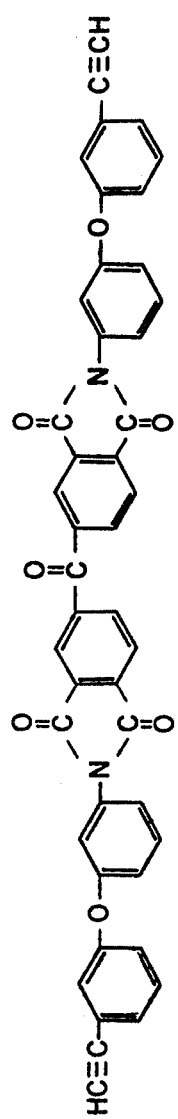

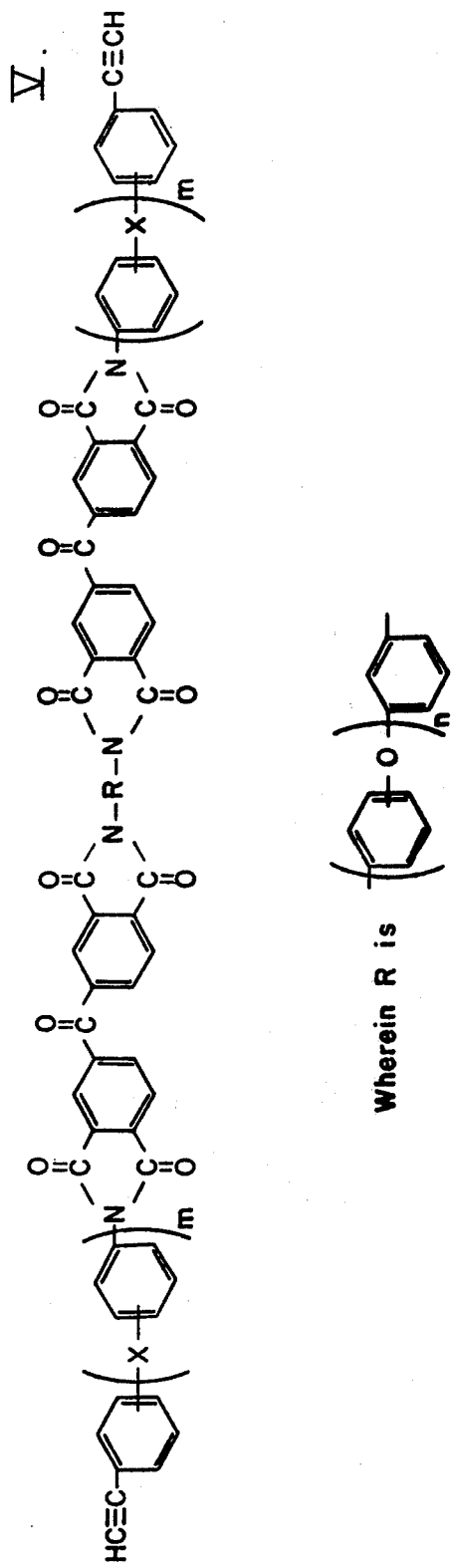

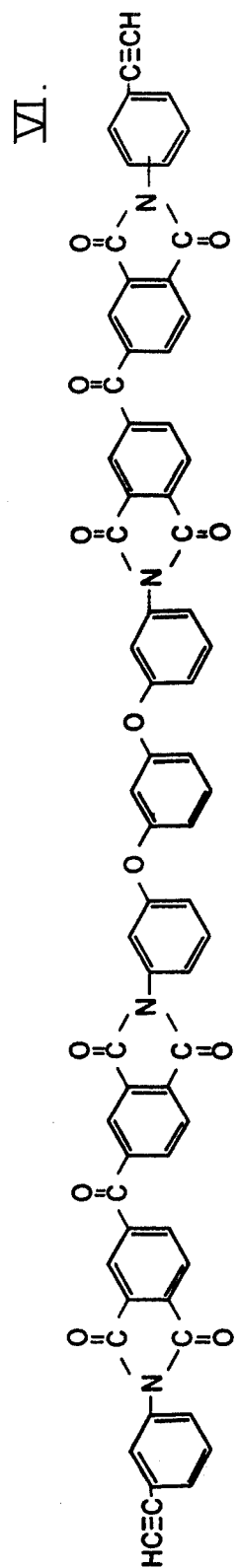

ETHNYL TERMINATED POLYIMIDE COMPOSITES

The invention herein described was made in the course of or under a contract with the Department of the Air Force.

RELATED APPLICATIONS

In U.S. application Ser. No. 526,775, filed Nov. 25, 1974, by applicant, a new class of ethynyl substituted polyimide copolymers, which cure by addition is disclosed. The present invention utilizes copolymers of the class disclosed in application Ser. No. 526,775 to form composites having superior physical and mechanical properties when compared to composite materials prepared from other polyimide polymers and/or copolymers.

This application is a division application drawn to non elected claims set forth in application Ser. No. 526,775 in response to the Examiner's restriction requirement dated Mar. 4, 1974.

BACKGROUND OF THE INVENTION

1. Field of the Invention

This invention relates to the preparation and formulation of composites comprised of polyimide polymers and copolymers.

2. Description of Prior Art

Composite materials have been used extensively as structural materials in aerospace and other applications where high strength, lightweight materials capable of withstanding high temperatures are required. Recently, considerable efforts have been made to extend the thermal stability range of these materials, while retaining their good structural strength and without increasing the weight of these materials. Currently, addition polymers such as epoxy resins are used in conjunction with fibers or fabrics to provide essentially void-free composite structures of the above class which exhibit good structural properties and are light in weight. These latter structures, however, are limited in their temperatures to about 150°–175° C because of the thermal stability characteristics of epoxy resins.

There are polyimides such as "P13N" from Ciba Geigy Corporation which give very low void content laminates which are useful at temperatures up to 288° C and there is a polyimide known as Kerimid 601 from Rhodia Corporation (a subsidiary of Rhone Poulenc Co.) which can provide void-free laminates which can withstand temperatures of up to 250° C.

Higher temperature laminating resins which cure through addition were apparently unknown prior to the development of the polyimides described in U.S. Pat. No. 3,845,018 assigned to the Hughes Aircraft Company, although there are condensation type polyimides which can be used to produce laminates which withstand temperatures up to 300°–320° C. The condensation resins are limited in their usefulness because the laminates and/or composite materials produced from them exhibit void contents as high as 20–40%. The voids are primarily caused by outgassing which occurs during the condensation mechanism cure.

Applicant Bilow herein, in conjunction with Drs. A. J. Landis and L. J. Miller of Hughes Aircraft Company, developed acetylene-substituted polyimide oligomers which cure through addition rather than condensation in an attempt to solve the void problem discussed above and retain good thermal resistant properties. Polyimide composites with as little as several tenths of 1% voids were obtained even when molding pressures as low as 200 psi were used. These materials are described in U.S. Pat. No. 3,845,018 above.

SUMMARY OF THE INVENTION

Applicant's present invention constitutes a substantial improvement over all of the above prior art in that it teaches the preparation of laminates and composites having high thermal stability, zero void content, and mechanical properties. This improvement is made possible because of the lower viscosity imparted to the laminating resin by incorporation of the reactive diluent diethynylbenzene into the ethynylated polyimide oligomer to form the copolymer disclosed in application Ser. No. 526,775. This is especially true in applications where impregnation of the oligomer into a highly porous substrate is important.

Applicants have found that copolymers of diethynylbenzene and other di- or poly-ethynyl-substituted diluents and an ethynylated polyimide oligomer such as one having the following general structure

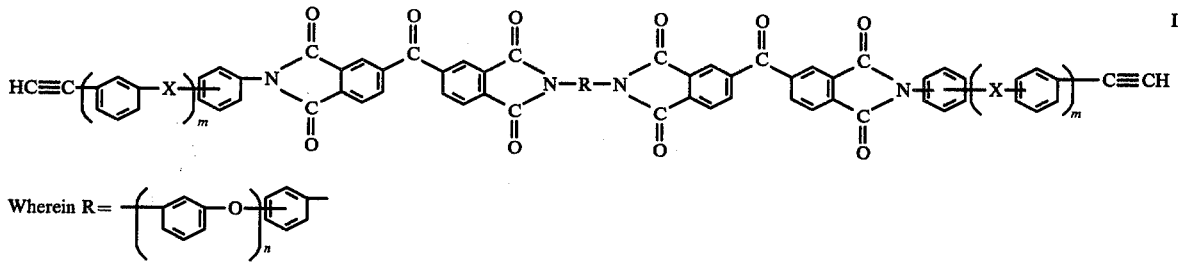

Wherein R = and wherein
n = 0 to 5
m = 0 to 5
and
x = O, S, CH$_2$, CO, or SO$_2$,

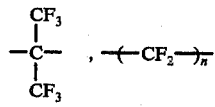

or —CF$_2$-O-CF$_2$— can be prepared which, when used to prepare fabricated laminates and other composite structures, result in void-free structures having high thermal resistance with excellent mechanical properties.

DESCRIPTION OF THE INVENTION

Our invention is a new composition of matter formed via the copolymerization of di- or polyethynyl-substituted diluents such as diethynylbenzene or diethynyldiphenyl ether with ethynyl-substituted polyimide oligomers and the use of the product to form composite materials.

One purpose of the invention is to provide a class of heat resistant copolymers which are thermosetting.

A second purpose is to provide a class of heat resistant copolymers which cure through addition rather than through condensation.

A third purpose is to provide thermosetting addition polymers which have sufficiently low viscosity to exhibit good melt flow characteristics, good molding properties and good coating characteristics, and a fourth purpose is to provide thermosetting resins which, when used in the fabrication of composite structures, yield cured resin matrices having very low or zero void contents. This latter purpose is very important since composite structures without voids can exhibit the optimum potential properties characteristic of their constituents.

void contents. In the specific case where $n = 2$ and $m = 0$, the oligomer is one called HR600. This is the one which was used in several of our experiments.

The advantage of this invention is largely attributed to the fact that the copolymer was produced from a polyimide oligomer and a liquid compound which could effectively interact with it during cure. The liquid effectively thins out the oligomer when the oligomer is heated and molded and allows the molten oligomer to flow readily into the pores and crevices in fillers and fabric reinforcements. Upon cure, the "thinner" co-reacts with the oligomer and thus it doesn't have to be removed from the resin as an ordinary solvent would have to be. The coreaction between the thinner and the oligomer during cure also yields a product with a higher crosslink density than that which the cured oligomer alone would have. With HR600, the copolymers of this invention can be visualized as being formed as follows:

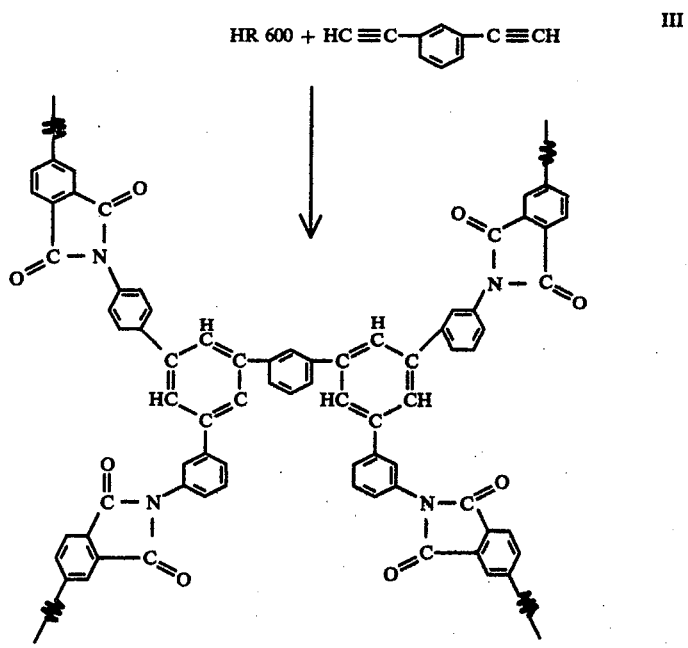

III

We have discovered that the incorporation of diethynylbenzene and analogous copolymerizable acetylene substituted diluents in a polyimide oligomer such as one having the following structure This illustration is not intended to show the entire repeating unit of the polymer, but is merely intended to show theoretically the way the compounds copolymerize. Although the whole molecule is not illustrated, this

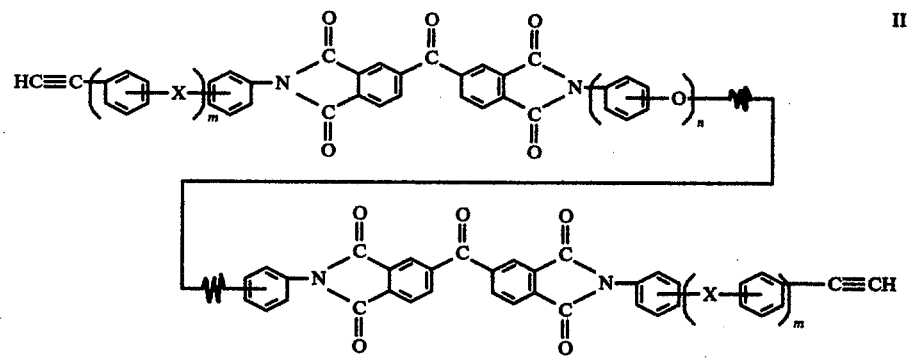

II wherein $x$, $n$, and $m$ are as defined previously, will yield products which allow the production of laminates with essentially zero void contents. Such laminates are considerably stronger than analogous laminates with larger partial structure adequately illustrates the high degree of complexity of the copolymers. Nuclear magnetic resonance spectroscopy supports the belief that cure occurs when aromatic rings are formed from the acetylene substituted polyimides. However, absolute proof of this theory has not been obtained and it may be that some other types of functional groups such as cyclobutadiene groups or bi-ethynyl groups might also be present to some degree. Nevertheless, the HR600 and diethynylbenzene obviously copolyermize as evidenced by the high strength of the composite structure obtained when a laminate was made.

One species of this invention can be produced by mixing diethynylbenzene with the ethynyl-substituted polyimide oligomer to form a copolymer for preparation of the composite. It is important, however, to avoid the use of excess diethynylbenzene since this compound can polymerize explosively. We thus prefer using less than 20% by weight of the diethynylbenzene in the oligomer. It is possible to pre-react these materials by careful heating of the mixtures at temperatures of about 400°–450° F, but prepolymerization is not essential since the oligomer can merely be diluted with the diethynylbenzene and used directly as a molding or laminating resin. Various other di- or polyethynyl-substituted diluents could also function in this capacity.

Specific examples of how to utilize the described copolymers within the matrix of a laminate is described below.

EXAMPLE I

A section of glass cloth (181E glass having an A-1100 finish) was cut to 10 × 10 inches and then weighed. A quantity of powdered HR600 was then weighed out sufficient to provide a 40% resin weight pick up on the fabric. To this amount of resin was added N-methylpyrrolidinone, producing a coating varnish after heating the mixture to 325° F to promote dissolution. The glass fabric was dipped into, and slowly pulled through the hot solution in a dip tank at 350° F. The coating process was repeated until all of the varnish was consumed; however, the fabric was air dried for 30 minutes followed by 15 minutes at 350° F. after each coating. Subsequently the coated fabric was dried for 16 hours under vacuum at 160° F. Next it was cut in half, and one half was made into a 6 ply laminate by molding it at 485° F and 200 psi using a contact time of 90 seconds and a cure time of 2 hours.

The other half of the fabric was brushed with a solution of diethynylbenzene (DEB) in hexane (20 ml.). Sufficient DEB was used so that its weight was equal to 10% of the HR600 resin weight. After a 5 minute air dry the coated "prepreg" fabric was placed into a polytetrafluoroethylene film bag and the bag was sealed and stored for 7 days. After aging the fabric, a laminate was molded at 485° F and 200 psi using a contact time of 90 seconds and a cure time of 2 hours.

A comparison of the properties of these two laminates showed the following:

| Property | Without DEB | With DEB |
|---|---|---|
| Thickness | 0.050" | 0.045" |
| Density | 1.91 g/cc | 2.11 g/cc |
| Resin Content | 23.0% | 24.1% |
| Void Content | 5.0% | 0% |

Void content calculations were based on a density of 1.40 g/cc for the HR600 resin and 2.51 g/cc for the glass fabric.

The difference between the two laminates was startling since under the specific molding conditions used the laminate without DEB had 5% voids and the laminate with DEB had 0% voids. Other molding conditions would show a different differential and the lower the molding pressure the bigger the differential that would be expected.

The advantage of adding DEB was even more evident when a comparison was made between the physical properties of the DEB containing laminate and several other HR600/181E glass laminates that had been fabricated earlier and tested previously. Results of this comparison are shown below

| Laminate No. | Void Content | Flexural Strength, psi at 550° F. | Flexural Modulus, psi at 550° F. |
|---|---|---|---|
| G 1996-31 (no DEB) | 3.5 | 26.5 × 10³ | 1.25 × 10⁶ |
| G 1996-22B (no DEB) | 1.4 | 28.5 × 10³ | 1.95 × 10⁶ |
| With DEB/HR600 | 0 | 34.5 × 10³ | 2.40 × 10⁶ |

EXAMPLE II

A chloroform solution of HR700 oligomer (whose structure is shown below) was mixed with sufficient diethynylbenzene (DEB)

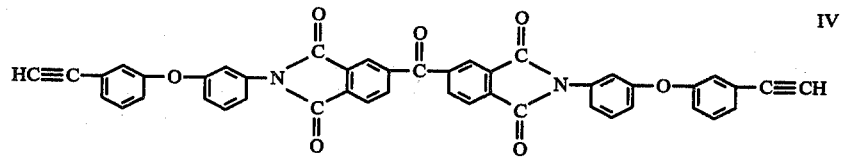

IV such that the oligomer DEB weight ratio was 10 to 1 and the mixture was poured into a small crystallizing dish. After the chloroform had evaporated, the oligomer mixture was pulverized and molded with heating at a pressure of 200 psi. Microscopic examination of the cured resin showed no evidence of porosity.

Having described our invention with sufficient particularity so as to teach one skilled in the art how to make and use it, the scope of our claims may now be understood as follows.

What is claimed is:

1. Laminating materials comprising copolymers or terpolymers consisting of an ethynyl-substituted polyimide oligomer coreacted with di- or polyethynyl-substituted diluent or mixtures of such diluents and a reinforcing fabric, filler or chopped fiber.

2. The materials of claim 1 wherein said oligomer is comprised of the following general structure:

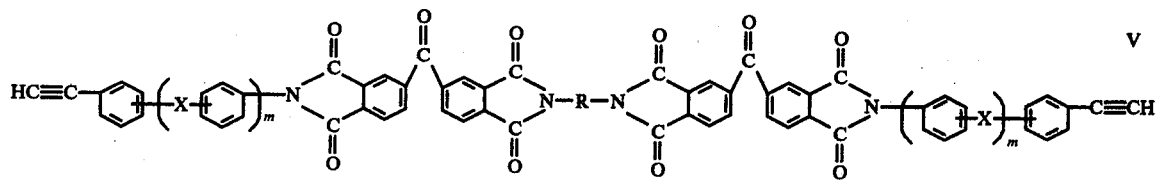

Wherein R is

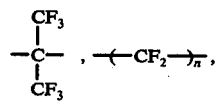

$n = 0$ to 5,
$m = 0$ to 5, and

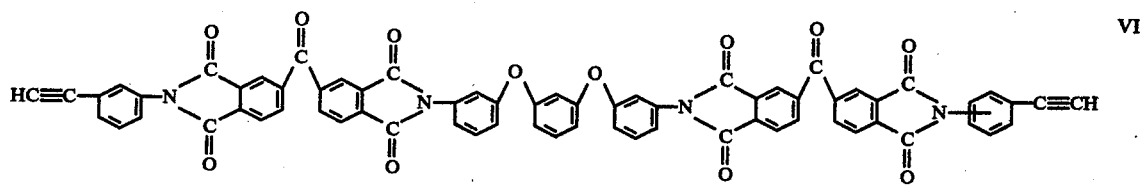

$x = O, S, CH_2, CO, SO_2,$

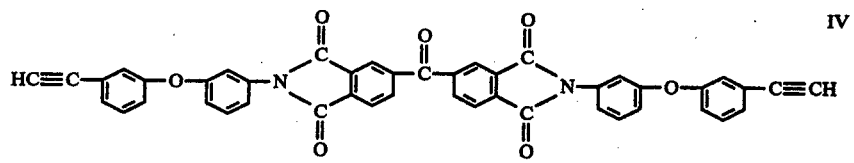

or $-CF_2\text{-}O\text{-}CF_2-$.

3. The materials of claim 1 wherein said copolymer is comprised from an oligomer having the following structure:

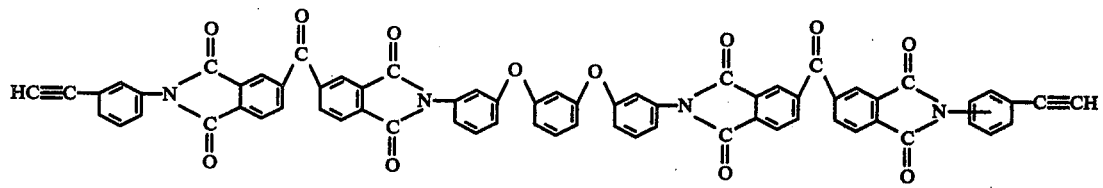

and wherein said diluents constitute up to 20% by weight of said oligomer.

4. The materials of claim 1 wherein the copolymer is the reaction product of diethynylbenzene and a polyimide oligomer having the following structure:

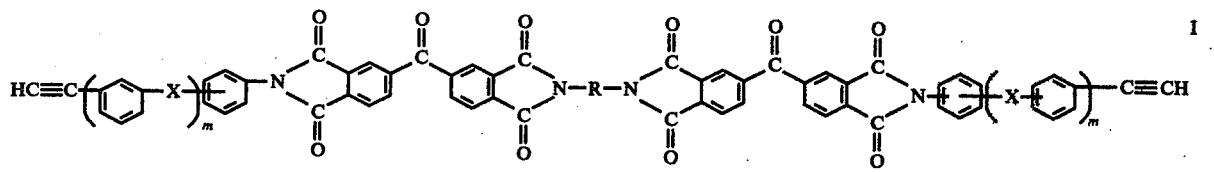

5. The material of claim 4 wherein diethynylbenzene constitutes 5–15% by weight of said polyimide oligomer.

6. The materials and laminates of claim 1 wherein the copolymer is comprised of diethynylbenzene (DEB) and an oligomer having the following structure:

7. Composite structural materials comprising copolymers or terpolymers consisting of polyimide oligomers having ethynyl terminated end groups coreacted with a di- or polyethynyl- substituted diluent or mixtures of such diluents and a reinforcing fabric, filter or chopped fiber.

8. The composite materials of claim 7 where said oligomer is comprised of the following general structure:

Wherein R = 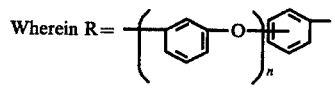
$n = 0$ to 5,
$m = 0$ to 5, and
$x = $ O, S, $CH_2$, CO, $SO_2$, 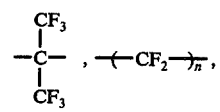 or $-CF_2\text{-}O\text{-}CF_2-$.
* * * * *